（12）United States Patent
Sugimoto et al.

(10) Patent No.: US 11,569,761 B2
(45) Date of Patent: Jan. 31, 2023

(54) POWER GENERATION BODY

(71) Applicants: SUMITOMO RUBBER INDUSTRIES, LTD., Kobe (JP); THE SCHOOL CORPORATION KANSAI UNIVERSITY, Suita (JP)

(72) Inventors: Mutsuki Sugimoto, Kobe (JP); Hiroshi Tani, Suita (JP)

(73) Assignees: SUMITOMO RUBBER INDUSTRIES, LTD., Kobe (JP); THE SCHOOL CORPORATION KANSAI UNIVERSITY, Suita (JP)

( * ) Notice: Subject to any disclaimer, the term of this patent is extended or adjusted under 35 U.S.C. 154(b) by 0 days.

(21) Appl. No.: 17/164,051

(22) Filed: Feb. 1, 2021

(65) Prior Publication Data
US 2021/0257931 A1  Aug. 19, 2021

(30) Foreign Application Priority Data

Feb. 17, 2020  (JP) .............................. JP2020-024032

(51) Int. Cl.
*H02N 1/04*  (2006.01)
(52) U.S. Cl.
CPC ..................... *H02N 1/04* (2013.01)
(58) Field of Classification Search
CPC .. H02N 1/04; H02N 1/08; B60C 23/00; H02J 7/32
USPC ........................................................ 310/310
See application file for complete search history.

(56) References Cited

U.S. PATENT DOCUMENTS

| 5,877,411 | A  | * | 3/1999 | Namerikawa | G01N 11/16 |
| | | | | | 73/64.53 |
| 11,437,932 | B2 | * | 9/2022 | Sugimoto | H02N 1/08 |
| 2010/0148950 | A1 | * | 6/2010 | Yamaguchi | B60C 23/0408 |
| | | | | | 340/442 |
| 2017/0299659 | A1 | * | 10/2017 | Fukuda | G01R 31/392 |
| 2020/0023693 | A1 | * | 1/2020 | Ochi | B60C 23/12 |

(Continued)

FOREIGN PATENT DOCUMENTS

| EP | 3 597 455 A1 | 1/2020 |
| JP | 2016-88473 A | 5/2016 |

(Continued)

OTHER PUBLICATIONS

Extended European Search Report for European Application No. 21153643.4, dated Sep. 9, 2021.

*Primary Examiner* — Ahmed Elnakib
(74) *Attorney, Agent, or Firm* — Birch, Stewart, Kolasch & Birch, LLP

(57) ABSTRACT

A power generation body includes a first member, a second member, and a packaging body. The first member includes a first insulating film that forms a first surface. The second member includes a second insulating film that forms a second film that opposes the first surface and comes into contact with the first surface. The packaging body hermetically seals the first member and the second member. The first member and the second member are configured such that a real contact surface area between the first surface and the second surface changes according to pressure applied to the first member and the second member, and one of the first insulating film and the second insulating film is positively charged and the other is negatively charged due to the real contact surface area changing.

18 Claims, 13 Drawing Sheets

(56) References Cited

U.S. PATENT DOCUMENTS

| | | | |
|---|---|---|---|
| 2021/0008932 A1* | 1/2021 | Stowell | B60C 23/068 |
| 2021/0257931 A1* | 8/2021 | Sugimoto | H02N 1/04 |
| 2021/0257933 A1* | 8/2021 | Sugimoto | H02N 1/08 |

FOREIGN PATENT DOCUMENTS

| | | | |
|---|---|---|---|
| JP | 2018-191454 A | | 11/2018 |
| JP | 2018191454 | * | 11/2018 |

* cited by examiner

POWER GENERATION BODY

CROSS REFERENCE

This application claims priority to Japanese Patent Application No. 2020-024032 filed on Feb. 17, 2020, the entire contents of which are incorporated herein by reference.

FIELD OF INVENTION

The present invention relates to a power generation body.

BACKGROUND

JP 2018-191454A discloses a frictional-charging power generation body. According to the power generation body of JP 2018-191454 (hereinafter called "Patent Literature 1"), a real contact surface area between a first insulating film and a second insulating film that oppose each other and are in contact with each other changes due to pressure applied to the power generation body, and the first insulating layer and the second insulating layer are charged to mutually opposite polarities.

JP 2016-088473A (hereinafter called "Patent Literature 2") discloses a tire assembly in which a power generation body is incorporated in a tire. The power generation body generates a voltage due to deformation of the tire. The power generation body includes a fixing portion that keeps the opposition distance between a first electrode structure and a second electrode structure at a predetermined interval. An electronic apparatus is embedded inside of the fixing portion. Accordingly, the electronic apparatus is protected from the environment inside of the tire.

JP 2018-191454A and JP 2016-088473A are examples of related art.

SUMMARY of INVENTION

As with Patent Literature 2, if a power generation body using frictional charging is incorporated inside of the tire, deformation of the tire needs to be transmitted to the power generation body. On the other hand, there is a possibility that the power generation body will receive an impact from a road surface or be influenced by a sudden temperature change or the like inside of the tire. In view of this, development of a power generation body that has sufficient durability even in this kind of environment has been desired. This applies not only to a case in which a power generation body using frictional charging is incorporated inside of a tire, but also to a case in which a power generation body is used in an environment in which the power generation body receives an impact, or an environment with marked temperature changes.

The present invention aims to provide a power generation body with high durability.

A power generation body according to a first aspect of the present invention includes a first member, a second member, and a packaging body. The first member includes a first insulating film that forms a first surface. The second member includes a second insulating film that forms a second surface that opposes the first surface and comes into contact with the first surface. The packaging body hermetically seals the first member and the second member. The first member and the second member are configured such that a real contact surface area between the first surface and the second surface changes according to pressure applied to the first member and the second member, and one of the first insulating film and the second insulating film is positively charged and the other is negatively charged due to the real contact surface area changing.

A power generation body according to a second aspect of the present invention is the power generation body according to the first aspect, in which the packaging body is made of rubber or elastomer.

A power generation body according to a third aspect of the present invention is the power generation body according to the first aspect or the second aspect, in which the packaging body is made of butyl rubber.

A power generation body according to a fourth aspect of the present invention is the power generation body according to any one of the first aspect to the third aspect, further including a cushioning material arranged on a side opposite to the first surface of the first member. The cushioning material is hermetically sealed in the packaging body.

A power generation body according to a fifth aspect of the present invention is the power generation body according to the fourth aspect, further including a plate-shaped weight that is arranged between the cushioning material and the first member and forms a pressing surface that presses the first member. The weight is hermetically sealed in the packaging body.

A power generation body according to a sixth aspect of the present invention is the power generation body according to the fifth aspect, in which the weight is made of a hard material.

A power generation body according to a seventh aspect of the present invention is the power generation body according to any one of the first aspect to the sixth aspect, in which the first member further includes a first electrode that is arranged on a rear surface of the first surface so as to come into contact with the first insulating film, the second member further includes a second electrode that is arranged on a rear surface of the second surface so as to come into contact with the second insulating film, and the first electrode and the second electrode are made of a flexible material.

A tire assembly according to an eighth aspect of the present invention includes the power generation body according to the seventh aspect, a tire attached to a wheel, and an electronic device configured to receive a supply of electrical power output from the power generation body. The power generation body is arranged inside of the tire.

A tire assembly according to a ninth aspect of the present invention is the tire assembly according to the eighth aspect, further including a power storage cell configured to accumulate electrical power output by the power generation body. The electronic device receives a supply of electrical power accumulated in the power storage cell.

A tire assembly according to a tenth aspect of the present invention is the tire assembly according to the eighth aspect or the ninth aspect, in which the electronic device includes a communication apparatus capable of data communication with an external apparatus.

A tire monitoring system according to an eleventh aspect of the present invention includes the tire assembly according to the tenth aspect, and an external control apparatus that can perform data communication with the communication apparatus. The communication apparatus transmits, to the external control apparatus, at least one piece of output data among a voltage and a current output by the power generation body and a physical amount obtained based on at least one of the voltage and the current, and the external control apparatus monitors information related to the tire based on the output data received from the communication apparatus.

A tire monitoring system according to a twelfth aspect of the present invention is the tire monitoring system according to the eleventh aspect, in which the information relating to the tire includes at least one of information relating to a rotational speed of the tire, information relating to wear of the tire, and information relating to a state of a road surface on which a vehicle in which the tire is mounted travels.

A tire monitoring system according to a thirteenth aspect of the present invention is the tire monitoring system according to the eleventh aspect or the twelfth aspect, in which the external control apparatus is mounted in a vehicle in which the tire assembly is included.

A tire monitoring method according to a fourteenth aspect of the present invention includes the following.

Preparing a vehicle in which the tire assembly according to any one of the eighth aspect to the tenth aspect is mounted.

Collecting output data of at least one of a voltage and a current output by the power generation body during traveling of the vehicle and a physical amount obtained based on at least one of the voltage and the current.

Monitoring information relating to the tire based on the collected output data.

According to the present invention, a power generation body with high durability is provided.

DETAILED DESCRIPTION OF THE PREFERRED EMBODIMENTS

Hereinafter, a power generation body according to an embodiment of the present invention, a tire assembly including the power generation body, a tire monitoring system using this tire assembly, and a monitoring method will be described with reference to the drawings.

1. Configuration of Power Generation Body

Figure 1:
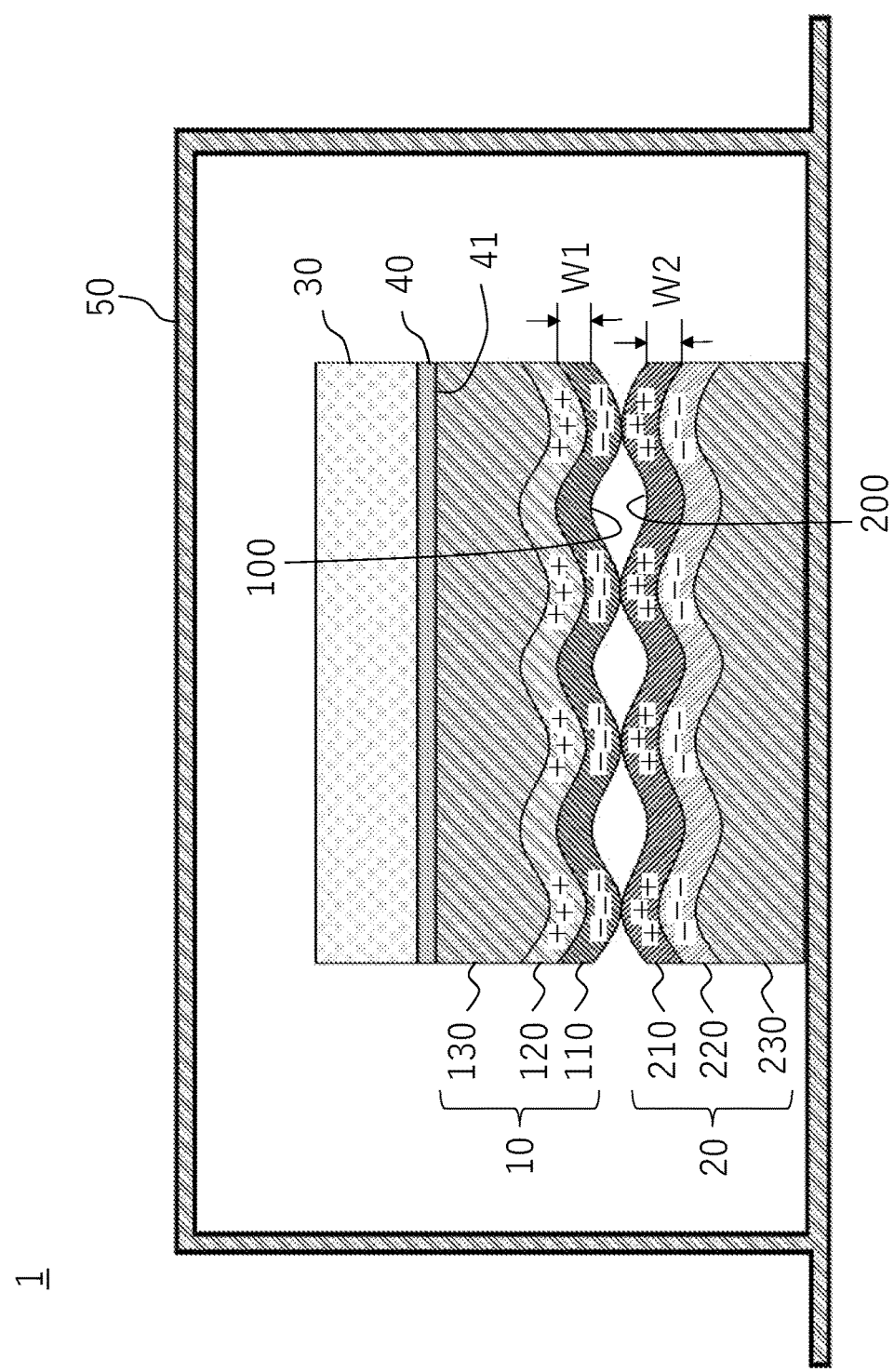
FIG. 1 is a cross-sectional schematic view of a power generation body according to an embodiment of the present invention.

FIG. 1 is a cross-sectional view showing a configuration of the power generation body 1 according to an embodiment of the present invention. As shown in FIG. 1, the power generation body 1 includes a first member 10, a second member 20, and a packaging body 50, and the first member 10 and the second member 20 are accommodated inside of the packaging body 50. Note that the direction during use of the power generation body 1 is not limited to the direction shown in FIG. 1.

The first member 10 includes a first base material 130, a first electrode 120, and a first insulating film 110, and these elements are stacked in the stated order from the outside to the inside of the power generation body 1. The first base material 130 is made of a flexible material or a viscoelastic material such as resin, rubber, or elastomer, such that deformation is possible when an external force is received. The first base material 130 of the present embodiment is made of silicone rubber. Many recesses and protrusions are formed on the outer surface on the side of the first base material 130 that comes into contact with the first electrode 120. Accordingly, recesses and protrusions corresponding to the recesses and protrusions of the first base material 130 are reproduced on the first surface 100 formed by the first insulating film 110 via the first electrode 120.

The first electrode 120 is a portion for drawing out an electrical charge generated in the first insulating film 110 to the exterior of the power generation body 1, and is arranged so as to come into contact with the first insulating film 110 on the rear surface of the first surface 100. The first electrode 120 is made of a conductive material such as a film made of Ag, Cu, or the like. The first electrode 120 is flexible and can deform following the deformation of the first base material 130. Also, the first electrode 120 reproduces the recesses and protrusions corresponding to the recesses and protrusions of the first base material 130 on the surface that comes into contact with the first insulating film 110.

The first insulating film 110 is a film that is made of an insulating body and is flexible. The first insulating film 110 forms the first surface 100. Recesses and protrusions corresponding to the recesses and protrusions of the first base material 130 are formed by the first base material 130 on the first surface 100. The first surface 100 opposes the second surface 200 formed by the later-described second insulating film 210, and comes into contact with the second surface 200. The first insulating film 110 charges to a polarity opposite to that of the second insulating film 210 when the real contact surface area, which is the substantial contact surface area between the first surface 100 and the second surface 200, changes due to pressure applied to the power generation body 1. That is, when the second insulating film 210 is positively charged, the first insulating film 110 is negatively charged. Also, when the second insulating film 210 is negatively charged, the first insulating film 110 is positively charged.

It is preferable that a ten-point average roughness of the first surface 100 is 100 µm or more and 2 mm or less. Note that the method for measuring the ten-point average roughness conforms to JIS B 0601:2001.

Note that when the first surface 100 and the second surface 200 "come into contact with each other", the first surface 100 and the second surface 200 need only come into partial contact with each other, and there may also be portions at which the first surface 100 and the second surface 200 are not in contact with each other.

The second member 20 includes a second base material 230, a second electrode 220, and a second insulating film 210, and these elements are stacked in the stated order from the outside to the inside of the power generation body 1. The second base material 230 is made of a flexible material or a viscoelastic material such as resin, rubber, or elastomer, such that deformation is possible when an external force is received. The second base material 230 of the present embodiment is made of silicone rubber. Many recesses and protrusions are formed on the outer surface on the side of the second base material 230 that comes into contact with the second electrode 220. Accordingly, recesses and protrusions corresponding to the recesses and protrusions of the second base material 230 are reproduced on the second surface 200 formed by the second insulating film 210 via the second electrode 220.

The second electrode 220 is a portion for drawing out an electrical charge generated in the second insulating film 210 to the exterior of the power generation body 1, and is arranged so as to come into contact with the second insulating film 210 on the rear surface of the second surface 200. The second electrode 220 is made of a conductive material such as a film made of Ag, Cu, or the like. The second electrode 220 is flexible and can deform following the deformation of the second base material 230. Also, the second electrode 220 reproduces the recesses and protrusions corresponding to the recesses and protrusions of the second base material 230 on the surface that comes into contact with the second insulating film 210.

The second insulating film 210 is a film that is constituted by an insulating body different from the first insulating film 110 and is flexible. The second insulating film 210 forms the second surface 200. Recesses and protrusions corresponding to the recesses and protrusions of the second base material 230 are formed by the second base material 230 on the second surface 200. The second surface 200 opposes the first surface 100 formed by the first insulating film 110, and comes into contact with the first surface 100. The second insulating film 210 charges to a polarity opposite to that of the first insulating film 110 when the real contact surface area between the first surface 100 and the second surface 200 changes due to pressure applied to the power generation body 1. That is, when the first insulating film 110 is positively charged, the second insulating film 210 is negatively charged. Also, when the first insulating film 110 is negatively charged, the second insulating film 210 is positively charged.

It is preferable that a ten-point average roughness of the second surface 200 is 100 μm or more and 2 mm or less. Note that the method for measuring the ten-point average roughness conforms to JIS B 0601:2001.

At least one of the thickness W1 of the first insulating film 110 and the thickness W2 of the second insulating film 210 is preferably 20 μm or less. Also, it is more preferable that the thickness W1 and the thickness W2 are both 20 μm or less.

The material constituting the first insulating film 110 and the second insulating film 210 can be selected from materials in which the main component is, for example, diamond-like carbon (DLC), perfluoropolyether, polymethyl methacrylate, nylon, polyvinyl alcohol, polyester, polyisobutylene, polyurethane (PU), polyethylene terephthalate, polyvinyl butyral, polychloroprene, natural rubber, polyacrylonitrile, polydiphenol carbonate, chlorinated polyether, polyvinylidene chloride, polystyrene, polyethylene, polypropylene, polyimide, polyvinyl chloride, polydimethylsiloxane, polytetrafluoroethylene, tetrafluoroethylene and hexafluoropropylene copolymer, tetrafluoroethylene-hexafluoropropylene copolymer (FEP), and other fluorocarbon organic matter.

Out of the above-described group, from the viewpoint of having little friction in the insulating films due to frictional contact between the first insulating film 110 and the second insulating film 210, it is preferable to use a material in which the main component is DLC, which has high hardness and a low frictional coefficient, or a fluorocarbon organic matter with a high lubricity. Also, from the viewpoint of increasing the electromotive force of the power generation body 1, it is preferable to select a substance that is more spaced apart on the charging series out of this group. Note that either of the first insulating film 110 and the second insulating film 210 may be positively charged or negatively charged.

In the present embodiment, the first insulating film 110 is made of FEP, and the second insulating film 210 is made of PU. Accordingly, in the present embodiment, the first insulating film 110 is a film that is negatively charged, and the second insulating film 210 is a film that is positively charged.

Figure 2:
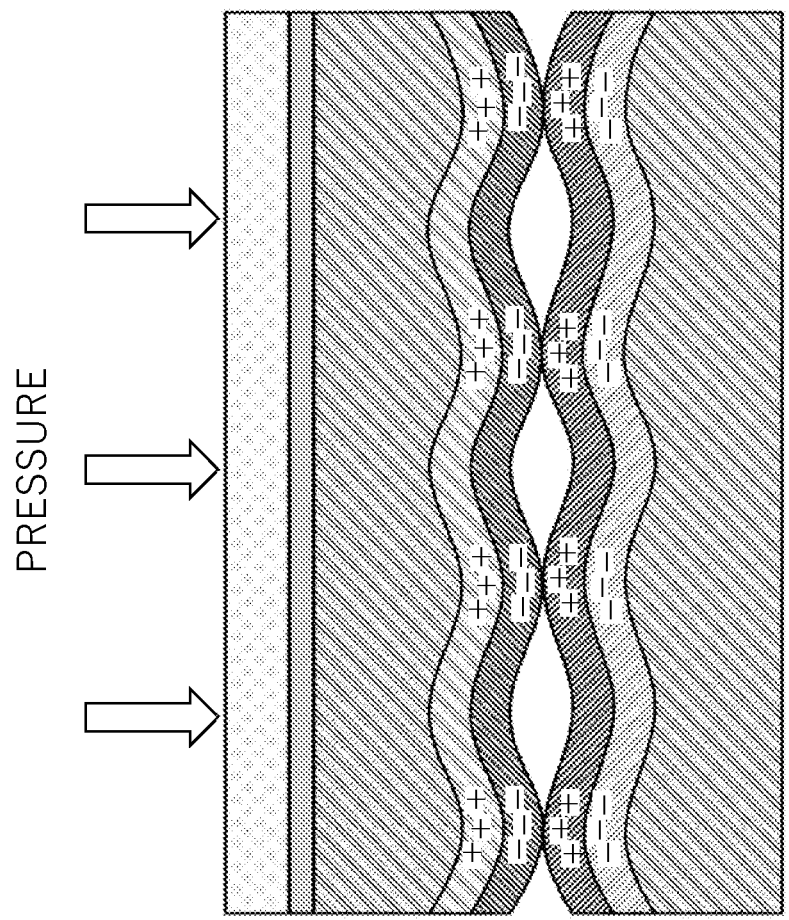
FIG. 2 is a diagram showing changes in the power generation body.

The first insulating film 110 and the second insulating film 210 are charged by operating as follows. As shown in FIG. 1, both the first surface 100 and the second surface 200 include recesses and protrusions, and even in a state in which pressure from the exterior is not applied to the power generation body 1, portions that are not completely spaced apart and are in contact with each other are left. At this time, the distance between the average surface of the first surface 100 and the average surface of the second surface 200 (average surface interval) is relatively large, and this is equivalent to a case in which the real contact surface area between the first surface 100 and the second surface 200 is relatively small. Next, when pressure is added to the power generation body 1 such that the first insulating film 110 and the second insulating film 210 come closer to each other, the shapes of the first surface 100 and the second surface 200 change so that the recesses and protrusions become slightly flat, and the average surface interval decreases (FIG. 2). In other words, the real contact surface area increases. Furthermore, when the pressure added to the power generation body 1 is removed, the first insulating film 110 and the second insulating film 210 once again separate from each other, and the average surface interval increases. In other words, the real contact surface area decreases. In this manner, when the real contact surface area changes, the charge amounts of the first insulating film 110 and the second insulating film 210 increase more than in the initial state, and more electrical charges are induced in the first electrode 120 and the second electrode 220.

Note that the real contact surface area can be changed also due to the first insulating film 110 and the second insulating film 210 moving relative to each other in the surface direction. Accordingly, among the forces applied to the power generation body 1, not only the force in the direction in which the average surface interval increases or decreases but also a force according to which the first insulating film 110 and the second insulating film 210 slide relative to each other in the surface direction contributes to the power generation of the power generation body 1.

The power generation body 1 may also further include a weight 40. The weight 40 is arranged on the side opposite to the first surface 100 of the first member 10 and includes a pressing surface 41 that comes into contact with the surface on the side opposite to the first electrode 120 side of the first base material 130. It is preferable that the weight 40 is made of a hard material and is formed into a flexible flat plate shape. Due to the mass of the weight 40, the weight 40 applies surface pressure to the first member 10 and the second member 20 in a direction in which the first insulating film 110 and the second insulating film 210 approach each other. Accordingly, the average surface interval between the first surface 100 and the second surface 200 changes more uniformly. Also, the contact portions and non-contact portions between the first surface 100 and the second surface 200 are formed more uniformly, and the charging of the first insulating film 110 and the second insulating film 210 is performed efficiently and without unevenness.

As will be described later, the power generation body 1 is arranged inside of the tire 70 that is mounted on the vehicle 6, and can be used to convert expansion and contraction deformations of the tire 70 into electrical power. In an embodiment, the power generation body 1 is arranged inside of a tread portion 700 of the tire 70 such that the first member 10 faces the inner side in the radial direction of the tire 70 and the second member 20 faces the outer side in the radial direction (see FIG. 5). The power generation body 1 rotates on a road surface together with the tire 70 and receives an impact from the road surface when it is located the closest to the road surface. Accordingly, the state in which the first member 10 rises from the second member 20 and there are very few contact portions between the first surface 100 and the second surface 200 is maintained for a relatively long time, and the power generation amount of the power generation body 1 can decrease. The weight 40 promotes uniform charging of the first insulating film 110 and the second insulating film 210, suppresses rising of the first member 10 due to the impact from the road surface, and improves the power generation amount of the power generation body 1.

It is preferable that the weight 40 is formed such that the pressing surface 41 overlaps with the entirety of the first surface 100 and the second surface 200. The pressing surface 41 is preferably constituted uniformly overall, but need not necessarily be formed using a smooth surface, and for example, may also be a generally flat surface in which punching holes or the like are formed overall, and may also be a generally flat surface in the form of a mesh.

The material constituting the weight 40, and the mass, density, and thickness of the weight 40 are not particularly limited, and can be selected as appropriate according to an embodiment of the power generation body 1. Metal is an example of a material constituting the weight 40. The weight 40 of the present embodiment is made of stainless steel (SUS).

The power generation body 1 may also further include a cushioning material 30. The cushioning material 30 is arranged on the side opposite to the first member 10 so as to sandwich the weight 40. When the first member 10 and the second member 20 receive a force in the direction in which the first surface 100 and the second surface 200 approach each other, the cushioning material 30 mitigates the force and ensures a sufficient power generation amount of the power generation body 1. For example, it is thought that the power generation body 1 is incorporated in the tire 70 and rotates together with the tire 70. The first member 10 and the second member 20 are compressed by receiving a force resulting from the inner pressure of the tire 70 and the centrifugal force resulting from the rotation of the tire 70. In this kind of environment, once the first surface 100 and the second surface 200 approach each other, it is difficult for them to separate from each other once again, and it is thought that the power generation amount of the power generation body 1 decreases as a result of the amount of change in the real contact surface area decreasing. Accordingly, the cushioning material 30 is preferably arranged in the direction in which the main pressing force is received on the outside of the first member 10 and the second member 20 such that it is possible to ensure leeway for the real contact surface area to change.

The material constituting the cushioning material 30 may also be a material having a pore structure such that it is easy for the volume to change. Examples of the material having the pore structure include nonwoven fabric, sponge, or a foam body made of resin, rubber, or elastomer, and the like. The nonwoven fabric may be made of one or multiple materials selected from polyamide, polyethylene, acrylic fiber, rayon, polyester, polypropylene, aramid, vinylon, and polylactic acid. Also, the nonwoven fabric may also be felt made of wool. Examples of foam bodies made of resin, rubber, or elastomer include substances obtained by kneading and vulcanizing a foaming agent as appropriate into one or more materials selected from urethane, silicone, acrylic resin, melamine, ethylene-vinyl acetate copolymer (EVA), polypropylene (PP), polyethylene (PE), polystyrene (PS), natural rubber (NR), butadiene rubber (BR), styrene butadiene rubber (SBR), butyl rubber (IIR), chloroprene rubber (CR), ethylene propylene rubber (EPDM), nitryl rubber (NBR), and fluororubber (FPM). The structure of the foam body made of resin, rubber, or elastomer is preferably open-cell rather than closed-cell. The material constituting the cushioning material 30 is preferably wool, from the viewpoint that it has high heat resistance, and is preferably a viscoelastic material such as resin, rubber, or elastomer, from the viewpoint of attenuating vibration caused by rising and rebound of the first member 10. By attenuating the vibration of the first member 10, the power generation amount not only further increases, but the time at which the power generation body 1 in the tire 70 starts to become the closest to the road surface and the time at which the power generation body 1 starts to separate from the road surface are suitably reflected in the voltage waveform output by the power generation body 1.

The packaging body 50 contains the first member 10, the second member 20, the cushioning material 30, and the weight 40 as a bundle in its interior, and hermetically seals them and blocks them from water vapor. The packaging body 50 bundles the first member 10, the second member 20, the cushioning material 30, and the weight 40 such that they do not disperse due to the rotation of the tire, blocks water vapor that can occur in the tire 70, and limits the influence that the water vapor has on power generation. It is preferable that the packaging body 50 is made of a deformable material that has low water-vapor permeability and has flexibility of such a degree that it can follow the deformation of the tire 70. Examples of this kind of material include rubber and elastomer.

Figure 4:
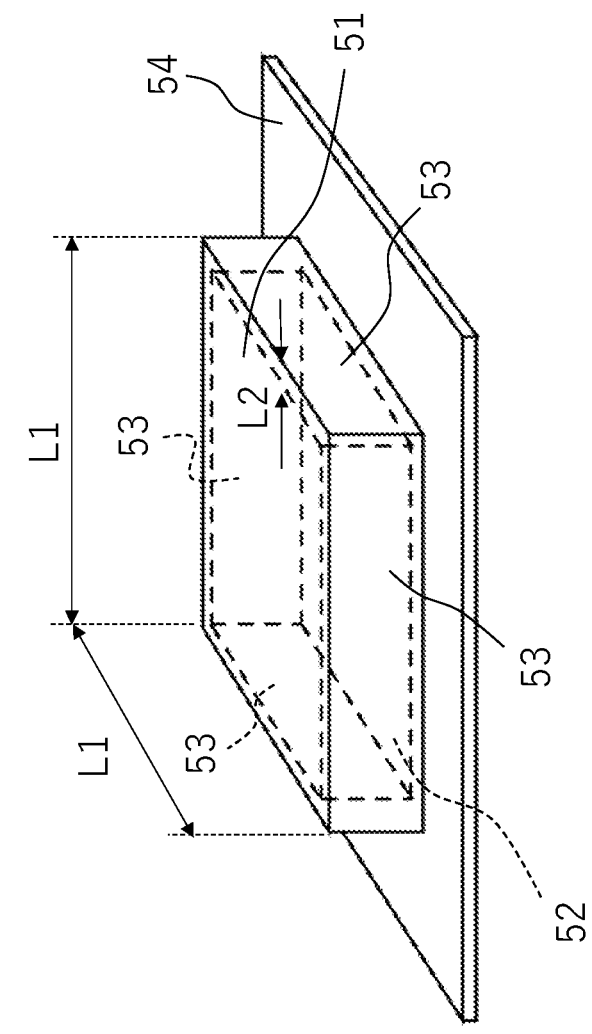
FIG. 4 is a perspective view of a packaging body according to an embodiment.

The packaging body 50 may also be formed into any shape, as long as members such as the first member 10 and the second member 20 can be hermetically sealed. FIG. 4 is an example of a configuration of the packaging body 50. As shown in FIG. 4, the packaging body 50 may also include an approximately square-shaped top surface portion 51, a bottom surface portion 52 that opposes the top surface portion 51, and four side surface portions 53 that stand upright between the top surface portion 51 and the bottom surface portion 52, and may also be configured to include an interior space that is defined by these portions 51 to 53. Furthermore, the bottom surface portion 52 may also include a flange portion 54. The top surface portion 51, the bottom surface portion 52, and the side surface portion 53 may also be made of the same materials or different materials. Also, at least some of the portions may also be formed integrally, and may also be adhered by using a suitable adhesive or the like according to the material.

It is preferable that the material constituting the packaging body 50 has a high tensile strength. As described above, a force of being compressed in the thickness direction is applied to the power generation body 1 incorporated inside of the tire 70 due to a force resulting from the internal pressure of the tire 70 and a centrifugal force resulting from rotation. On the other hand, a force of being pulled in the thickness direction due to the impact from the road surface is also applied to the power generation body 1. Accordingly, the packaging body 50 is preferably made of a material that can resist this kind of force. In particular, according to the following assumption, the tensile strength of the material constituting the packaging body 50 is preferably 3.6 MPa or more.

A stress force is considered which occurs in the side surface portion 53 of the packaging body 50 when the tire 70 (tire assembly 7) with a radius r (m) and in which the power generation body 1 is incorporated travels at a travel velocity of v (km/h). The centrifugal force that acts of the cushioning material 30, the weight 40, and the first member 10 is expressed as $mv^2/r$ using the mass m (g) of the cushioning material 30, the weight 40, and the first member 10. Here, when the travel velocity v of the tire 70 is 160 (km/h), the radius r is 0.33 (m), and the mass m is 30 (g), the centrifugal force $mv^2/r$ that acts on the cushioning material 30, the weight 40, and the first member 10 is about 180 (N). Note that it is assumed that the travel velocity v of the tire 70 is the maximum velocity of the tire 70, which is defined by a velocity symbol of the tire 70.

Here, when the cross-sectional area of one side surface portion 53 of the packaging body 50 is A ($m^2$), the stress P (MPa) that occurs in the side surface portion 53 is indicated by $(mv^2/r)/A$. In the packaging body 50 shown in FIG. 4, when the length of one side of the side surface portion 53 is expressed as L1 (m) and the thickness of the side surface portion 53 is expressed as L2 (m), A=L1×L2 is achieved. Here, if the length L1 is 0.05 (m) and the thickness L2 is 0.001 (m), the stress P (MPa) is about 3.6 MPa. Examples of materials with a tensile strength of 3.6 MPa or more include natural rubber (NR), styrene butadiene rubber (SBR), butadiene rubber (BR), and butyl rubber (IIR). The tensile strength of material in which one of these rubbers is used or a plurality of these rubbers are mixed is generally 5 MPa to 15 MPa. Note that when the radius r of the tire is smaller than this, the centrifugal force and the stress P become greater than this. For example, when r=0.25 (m) is satisfied, $mv^2/r$ is approximately 236 (N) and the stress P is approximately 4.7 (MPa). Accordingly, with the above-described material, even if applied to a tire with a small radius, it is understood that sufficient tensile strength is ensured with the dimension of the packaging body 50 left unchanged.

2. Configuration of Sensor Module

Figure 3:
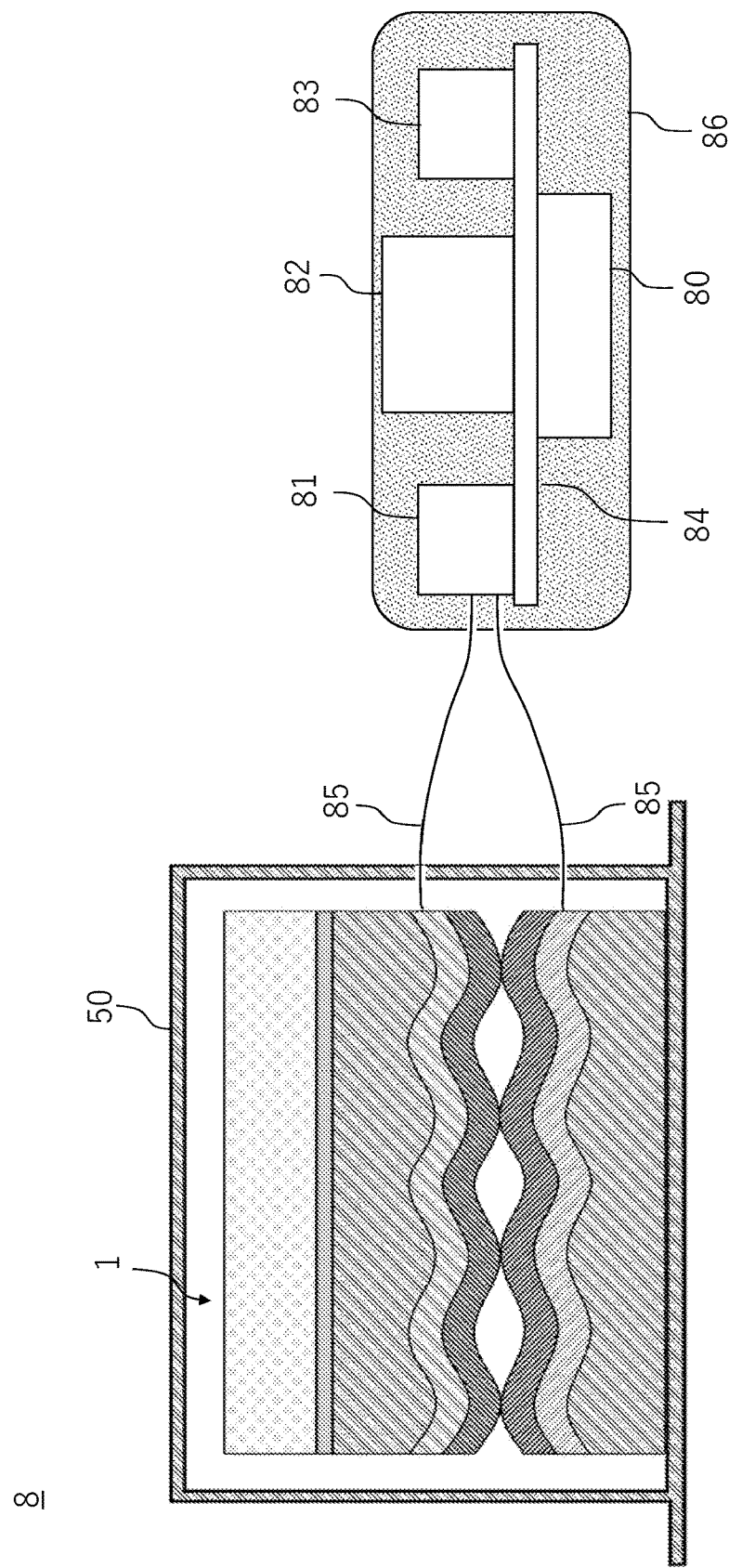
FIG. 3 is a cross-sectional schematic view of a sensor module according to an embodiment.
Figure 7:
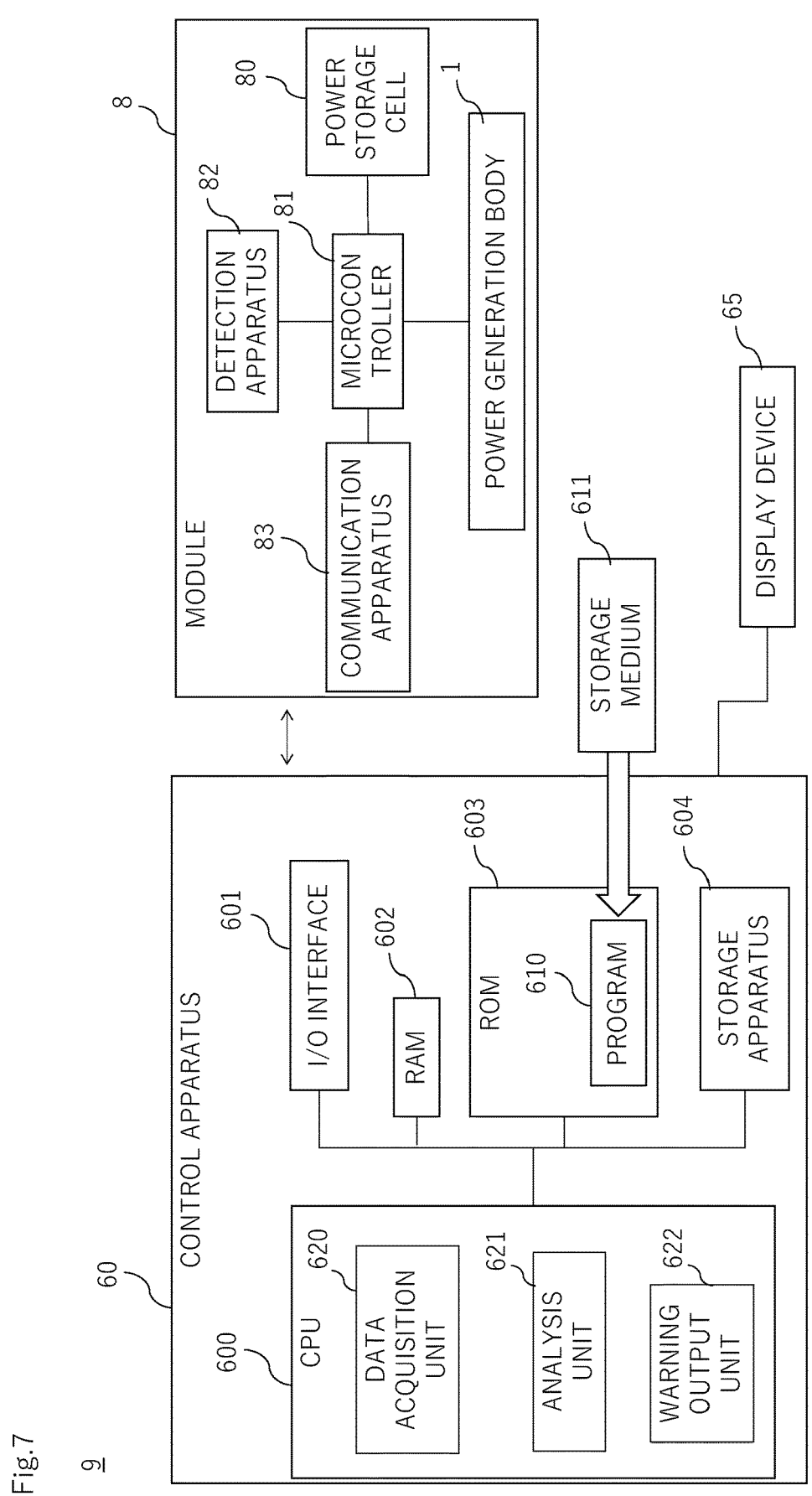
FIG. 7 is a block diagram showing an electrical configuration of the monitoring system.

Hereinafter, an embodiment of a sensor module (hereinafter referred to simply as "module") 8 including the power generation body 1 will be described. The module 8 is, for example, arranged inside of the tire 70 as will be described later, detects information relating to the tire 70, and outputs the detection result to the control apparatus 60 or the like of the vehicle 6. The detection result output by the module 8 is used in various types of control systems, such as a tire air pressure monitoring system (TPMS) mounted in the vehicle 6. FIG. 3 is a schematic diagram showing a configuration of the module 8. Also, FIG. 7 shows an electrical configuration of the module 8.

The power generation body 1 is electrically connected to a circuit including a power storage cell 80 and an electronic device via the first electrode 120 and the second electrode 220. Accordingly, the power generation body 1 is included in the module 8 together with the power storage cell 80 and the electronic device. In the module 8, the power generation body 1 can supply power to the electronic device. Also, due to a physical amount output by the power generation body 1 being detected by another electronic device, the power generation body 1 can also be used as a sensor. For example, if the module 8 is applied to the tire 70, the data on the voltage output by the power generation body 1 includes, for example, information relating to the rotational speed of the tire 70, information relating to the wear of the tire 70, and information relating to the state of the road surface on which the tire 70 travels.

The module 8 includes the power generation body 1, the power storage cell 80, and the electronic device that receives a supply of power output from the power generation body 1, and the power storage cell 80 and the electronic device are electrically connected to each other via a printed circuit board 84. A microcontroller 81, a detection apparatus 82, and a communication apparatus 83 are included in the electronic devices of the present embodiment. The power generation body 1 is electrically connected to the microcontroller 81 by lead wires 85.

The microcontroller 81 includes a processor, a main memory, and a non-volatile rewritable storage apparatus. Programs for controlling the operations of the module 8 are written in the storage apparatus of the microcontroller 81, and the programs are executed by the processor. The microcontroller 81 accumulates the electrical power output by the power generation body 1 in the power storage cell 80 and distributes the accumulated electrical power as needed to the microcontroller 81, the detection apparatus 82, and the communication apparatus 83.

Also, the microcontroller 81 is configured to perform transmission and reception of data with an external control apparatus via the communication apparatus 83. The external control apparatus is, for example, the later-described control apparatus 60 of the vehicle 6. The data transmitted from the microcontroller 81 to the control apparatus 60 includes the data relating to the power output by the power generation body 1 and data output by the detection apparatus 82.

The microcontroller 81 detects the voltage or the current output by the power generation body 1 using a detection circuit (not shown). The microcontroller 81 stores the detected voltage or current in the storage apparatus as data in chronological order. The microcontroller 81 causes the communication apparatus 83 to transmit the data stored in the storage apparatus to the control apparatus 60 at a predetermined timing. Note that the data to be transmitted need not be the data on the value detected using the detection circuit itself, and may include data of a physical amount (e.g., electrical power data) obtained based on at least one of the voltage and the current, instead of or in addition to the data of the detected value.

The detection apparatus 82 is a sensor for detecting the state in the tire 70. The detection apparatus 82 may detect, for example, a value relating to air pressure, a value relating to temperature, or the like as the state in the tire 70. The detection apparatus 82 outputs the detected value to the microcontroller 81.

The communication apparatus 83 includes an antenna and can perform transmission and reception of data with an external apparatus wirelessly. In the present embodiment, the external apparatus includes the control apparatus 60 of the vehicle 6 in which the tire assembly 7 is mounted.

The power storage cell 80, the microcontroller 81, the detection apparatus 82, the communication apparatus 83, and the printed circuit board 84 in which these are connected are integrally sealed in using an epoxy resin 86. Accordingly, water vapor in the tire 70 is prevented from entering the power storage cell 80 and the electronic devices 81 to 83, and the state in which the power storage cell 80 and the electronic devices 81 to 83 are fixed to the printed circuit board 84 is maintained. However, the detection element (not shown) of the detection apparatus 82 may also be in a state of being exposed from the epoxy resin 86 as needed. Also, the lead wires 85 extend to the outside of the epoxy resin 86.

3-1. Configuration of Tire Assembly

Figure 6:
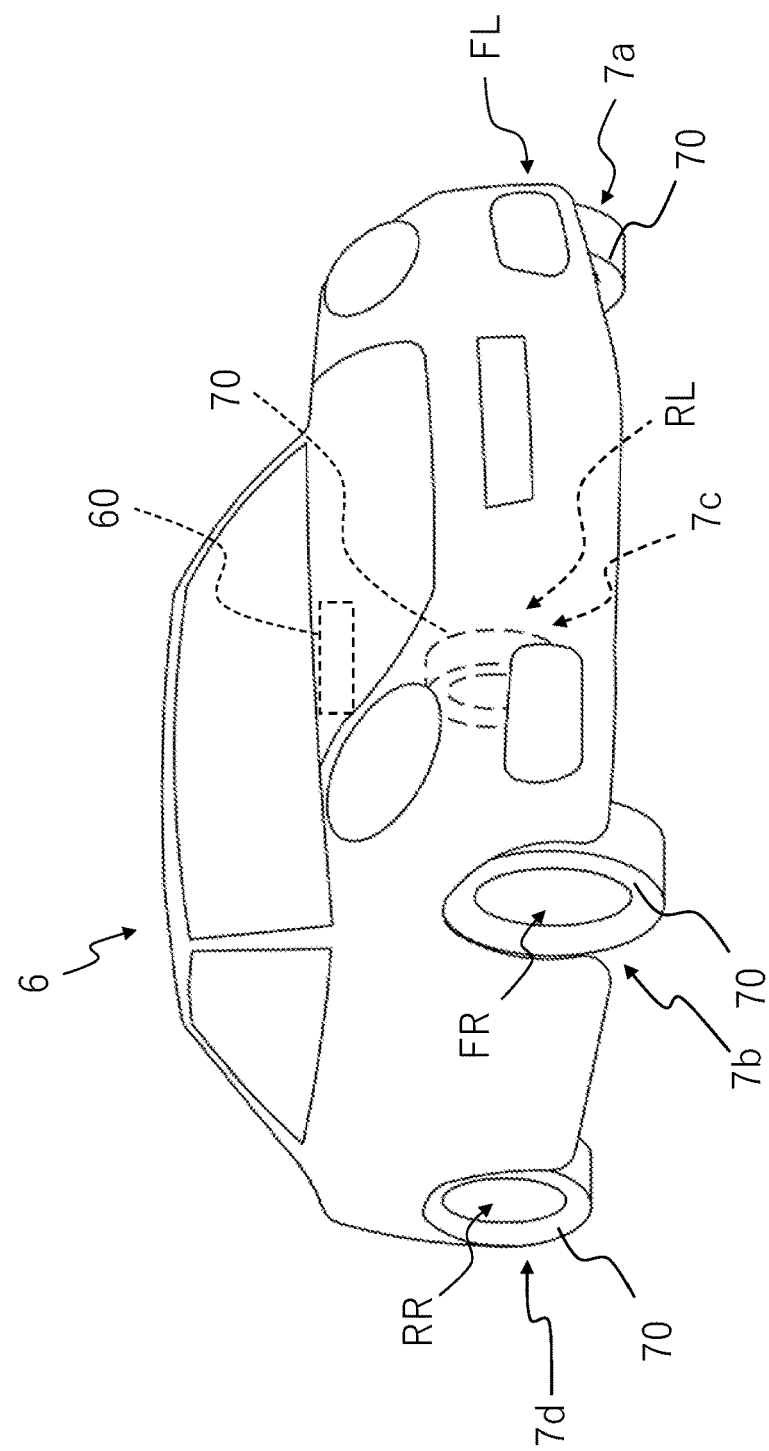
FIG. 6 is a diagram showing an overall configuration of a monitoring system according to an embodiment.

Hereinafter, a detailed configuration of the tire assembly 7 will be described with reference to the drawings. As shown in FIG. 6, the tire assembly 7 is attached to the wheels of the vehicle 6. The vehicle 6 is a four-wheeled vehicle, and includes a front-left wheel FL, a front-right wheel FR, a rear-left wheel RL, and a rear-right wheel RR. Tire assemblies 7a to 7d are respectively attached to the wheels FL, FR, RL, and RR. The tire assemblies 7a to 7d are attached to different wheels, but have the same structure and function. Accordingly, the tire assemblies 7a to 7d will be referred to as tire assemblies 7 without making a distinction therebetween. The tire assemblies 7 transmit detection data to the control apparatus 60 mounted in the vehicle 6.

Figure 5:
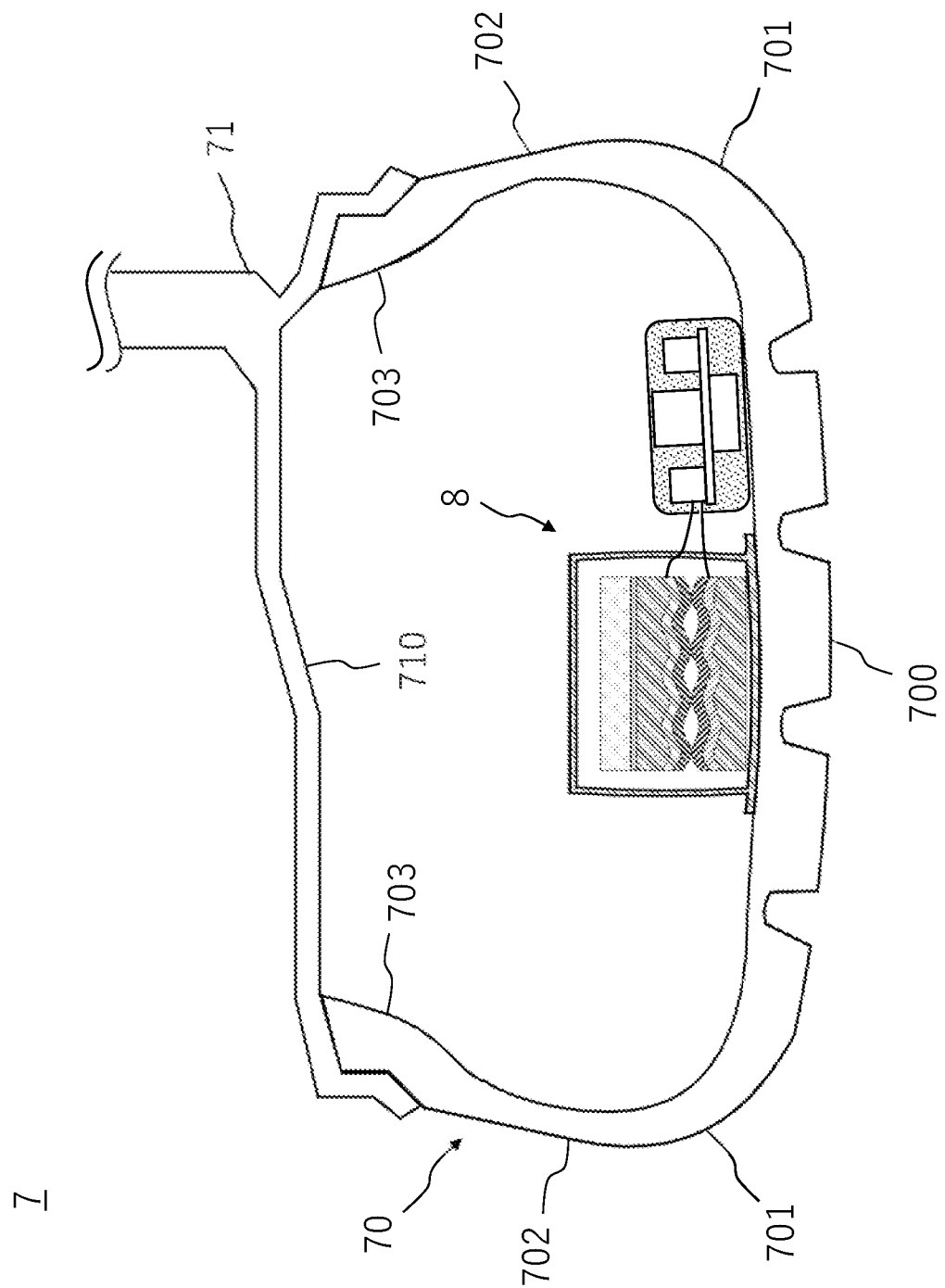
FIG. 5 is a cross-sectional schematic view of a tire assembly according to an embodiment.

FIG. 5 is a schematic partial cross-sectional view of the tire assembly 7. In FIG. 5, the direction from the side away from the page surface to side near the page surface, or the direction from the side near the page surface to the side away from the page surface is the peripheral direction of the tire assembly 7. The tire assembly 7 includes the tire 70 and the module 8. The tire assembly 7 is attached to the wheels FL, FR, RL, and RR of the vehicle 6 via a wheel 71. A wheel rim 710 is formed on the peripheral edge portion of the wheel 71.

The tire 70 is made of an elastic material such as rubber or elastomer, and includes a tread portion 700, a shoulder portion 701, a side wall portion 702, and a bead portion 703. The tread portion 700 is a portion that demarcates the side peripheral surface of the tire assembly 7, and allows the vehicle 6 to travel forward due to coming into contact with the road surface and generating friction. The shoulder portion 701 is a portion that is adjacent to the tread portion 700 and the side wall portion 702. The side wall portion 702 generates flexure by bending so as to absorb an impact from the road surface. The bead portion 703 has a bead wire (not shown) built therein, and is fixed to the wheel rim 710.

The module 8 is arranged inside of the tire 70. The portion other than the power generation body 1 of the module 8 is fixed to the inner side surface of the tire 70 near the power generation body 1. The location at which the portion of the module 8 other than the power generation body 1 is fixed is not particularly limited, and for example, may be fixed to the tread portion 700, the shoulder portion 701, the side wall portion 702, or the like.

The power generation body 1 is arranged such that the second member 20 is on the outer side in the radial direction of the tire 70 and the first member 10 is on the inner side in the radial direction of the tire 70. In the example shown in FIG. 5, the packaging body 50 is fixed so that the bottom surface portion 52 including the flange portion 54 comes into contact with the inner side surface of the tire 70. The method for fixing the packaging body 50 to the tire 70 is not particularly limited, and the packaging body 50 may be joined physically or chemically. Note that the packaging body 50 including the power generation body 1 is preferably fixed to the inner side of the tread portion 700, but the location at which it is fixed is not limited as long as the power generation body 1 can generate power using the vibration of the tire 70, and for example, may also be fixed to the shoulder portion 701 or the side wall portion 702.

3-2. Operations of Tire Assembly

Hereinafter, operations of the tire assembly 7 will be described. In the state in which the tire assembly 7 is stationary, the average surface interval and the real contact surface area between the first surface 100 of the first insulating film 110 and the second surface 200 of the second insulating film 210 do not change, or hardly change at all. For this reason, an electrical charge is not induced or is hardly induced at all in the first electrode 120 and the second electrode 220, and the electrical power output by the power generation body 1 is zero or very small.

When the tire assembly 7 rotates on the road surface, the tread portion 700 receives the impact at the portion that comes into contact with the road surface. When this impact is transmitted to the entirety of the tire 70, flexure occurs in the side wall portion 702 in particular and the entirety of the tire 70 deforms so that the impact is absorbed. Thereafter, the side wall portion 702 attempts to return from deformation, but receives the impact from the road surface once again via another portion of the tread portion 700. In this manner, the tire 70 repeats expansion and contraction deformation overall. The expansion and contraction deformation of the tire 70 is transmitted to the power generation body 1 fixed to the inner side surface of the tread portion 700. The power generation body 1 deforms corresponding to the transmitted expansion and contraction deformation of the tire 70. As a result, the first insulating film 110 and the second insulating film 210 come near each other and separate from each other, or the relative positions of the first insulating film 110 and the second insulating film 210 shift in the surface direction, whereby the real contact surface area changes. In this manner, an electrical charge is induced in the first electrode 120 and the second electrode 220, and the power generation body 1 outputs electrical power that is greater than that when the tire assembly 7 is stationary.

The current drawn out from the power generation body 1 is proportional to the temporal change in the average surface interval between the first surface 100 and the second surface 200. When the power generation body 1 passes over the road surface via the tread portion 700 (when the power generation body 1 is the closest to the road surface at the lowest position), the temporal change in the average surface interval becomes the greatest, and positive and negative peaks that form a pair appear in the voltage waveform output by the power generation body 1. Accordingly, the amount of time from when a peak appears to when the next peak appears indicates the amount of time for the tire assembly 7 to perform one rotation, and based on the data on the voltage output by the power generation body 1, it can be said that information relating to the rotational speed of the tire assembly 7 can be acquired.

Also, if conditions such as the rotational speed of the tire assembly 7 and the road surface on which the tire assembly 7 rotates are identical, the temporal change in the average surface interval is different depending on whether the tire 70 is normal (a case in which the tire 70 is not worn) or the tire 70 is worn (a case in which a slip sign has appeared). Voltage waveforms output by the power generation body 1 are acquired in advance at a predetermined rotational speed for when the tire 70 is normal and when the tire 70 is worn, and by comparing them with the voltage waveform output by the power generation body 1 at the rotational speed, it is possible to determine whether or not the tire 70 is worn. Accordingly, it can be said that information relating to the wear of the tire 70 included in the tire assembly 7 can be obtained based on the voltage waveform output by the power generation body 1.

Furthermore, if conditions such as the rotational speed of the tire assembly 7 and the degree of wear of the tire 70 are identical, temporal change in the average surface interval differs depending on the state of the road surface (asphalt, gravel road, wet road surface, etc.). Voltage waveforms output by the power generation body 1 at a predetermined rotational speed are acquired in advance for road surfaces of different states, and by comparing them with the voltage waveform output by the power generation body 1 at the rotational speed, it is possible to determine the state of the road surface on which the tire assembly 7 is currently rotating (the road surface on which the vehicle 6 is traveling). Accordingly, it can be said that information relating to the state of the road surface on which the vehicle 6 travels can be acquired based on the voltage waveform output by the power generation body 1.

The microcontroller 81 accumulates the power output from the power generation body 1 in the power storage cell 80. The microcontroller 81 monitors the remaining battery amounts of the microcontroller 81, the detection apparatus 82, and the communication apparatus 83 at a predetermined period, and if one of the battery remaining amounts reaches a predetermined threshold value or less, the microcontroller 81 causes the power storage cell 80 to supply the accumulated electrical power to that battery.

In parallel with the assigning of the electrical power, the microcontroller 81 stores the detected output value of the power generation body 1 and the value output from the detection apparatus 82 in the storage apparatus as output data in chronological order. The microcontroller 81 causes the communication apparatus 83 to transmit these pieces of output data stored in the storage apparatus to the control apparatus 60 at a predetermined timing. The transmission interval of the output data can be, for example, once every 40 seconds.

4-1. Configuration of Monitoring System

Hereinafter, an example of a configuration of a monitoring system (hereinafter referred to simply as "system" in some cases) 9 for information relating to the tire 70, which includes the tire assembly 7 and the control apparatus 60 of the vehicle 6, will be described. The system 9 can start the following monitoring processing when, for example, the power source of the control apparatus 60 is switched on, and can stop the monitoring processing when a predetermined amount of time elapses after the vehicle 6 stops.

FIG. 6 is a diagram showing the entirety of the system 9, and FIG. 7 is block diagram showing an electrical configuration of the system 9. In the system 9, the control apparatus 60 acquires the output data transmitted from the module 8 and monitors information relating to the tire 70. The control apparatus 60 monitors, for example, the air pressure of the tire 70, the rotational speed of the tire 70, and the like. The air pressure and rotational speed of the tire 70 is used in, for example, processing of a tire air pressure monitoring system (TPMS), processing for load estimation of the vehicle 6, and the like. Also, the control apparatus 60 monitors, for example, the wear state of the tire 70 and the state of the road surface on which the vehicle 6 travels.

The control apparatus 60 includes a CPU 600, an I/O interface 601, a RAM 602, a ROM 603, and a non-volatile re-writable storage apparatus 604. The I/O interface 601 is a communication apparatus for performing communication using a wire or wirelessly with an external apparatus such as a display device 65 or the tire assembly 7. A program 610 for controlling the operations of the system 9 is stored in the ROM 603. The program 610 is written in the ROM 603 from a storage medium 611 such as a CD-ROM or a USB memory. The CPU 600 virtually operates as a data acquisition unit 620, an analysis unit 621, and a warning output unit 622 by reading out the program 610 from the ROM 603 and executing it. Operations of the units will be described in detail later. Note that the storage location of the program 610 may also be the storage apparatus 604 instead of the ROM 603. Also, the RAM 602 and the storage apparatus 604 are used as appropriate in computation performed by the CPU 600.

The storage apparatus 604 is constituted by a hard disk, a flash memory, or the like. A pressure decrease threshold value according to which the analysis unit 621 determines whether or not the pressure of the tire 70 has decreased is stored in advance in the storage apparatus 604. The pressure decrease threshold value may also be a value of air pressure that if the pressure falls below, it is determined that the pressure has decreased. Alternatively, the pressure decrease threshold value can also be the air pressure reached due to the pressure decreasing by a predetermined pressure decrease rate from an initial value of the air pressure of each tire stored in the storage apparatus 604 in advance.

Also, the output waveforms of the power generation body 1 in various travel conditions of the vehicle 6 are stored in advance in the storage apparatus 604 as, for example, voltage waveforms. The stored voltage waveforms may also be, for example, waveforms obtained when the tire 70 is normal and waveforms obtained when the tire 70 is worn, at a predetermined rotational speed of the tire assembly 7. The stored voltage waveform may also be, for example, a waveform obtained when the vehicle 6 travels on road surfaces of different types at a predetermined rotational speed of the tire assembly 7. Furthermore, a waveform obtained when the tire 70 is normal and a waveform obtained when the tire 70 is worn may also be stored for each type of road surface.

The mode is not limited as long as the display device 65 can convey various types of information to the user by displaying the information. For example, the display device 65 can be realized in any form, such as a liquid crystal monitor, a liquid crystal display element, an organic EL display, or a plasma display. The attachment position of the display device 65 can be selected as appropriate, but for example, it is desirable to provide the display device 65 at a position that is easy for the driver to recognize, such as on an instrument panel. If the control apparatus 60 is connected to a car navigation system, the monitor for car navigation can also be used as the display device 65, and a multi-information display can also be used as the display device 65.

4-2. Operations of Monitoring System

Hereinafter, processing performed when the detection apparatus 82 of the module 8 detects a value relating to the air pressure of the tire 70 will be described.

The data acquisition unit 620 acquires data transmitted from the microcontroller 81. This data includes data of a value relating to the air pressure of the tire 70 detected by the detection apparatus 82, data of the output voltage of the power generation body 1 that was detected by the microcontroller 81, and data for identifying the microcontroller 81 (i.e., the tire assembly 7) that is the transmission source of the data. Note that the positions of the wheels at which the tire assemblies 7a to 7d are attached are associated in advance.

The analysis unit 621 calculates the current air pressure for each tire assembly 7 based on the data on the value relating to the air pressure of the tire 70. The analysis unit 621 compares the calculated air pressure and the pressure decrease threshold value stored in the storage apparatus 604, and determines whether or not there is a tire 70 with decreased pressure (whether or not the tire 70 is abnormal). The analysis unit 621 may also specify which tire 70 has decreased pressure using the data for identifying the tire assembly 7. If it is determined that no tire 70 has decreased pressure and all of the tires 70 are normal, the analysis unit 621 repeats the same processing for the data received next. On the other hand, if an abnormality is determined, the analysis unit 621 causes the warning output unit 622 to output a pressure decrease warning. The warning output unit 622 notifies the user that the tire 70 has decreased pressure and prompts adjustment of the air pressure by, for example, displaying a message warning of pressure decrease on the display device 65 or the like.

In parallel to this, or before or after this, the analysis unit 621 calculates the rotational speed of the tire assembly 7 based on the data on the output voltage of the power generation body 1. In this manner, the power generation body 1 may also be used as a velocity sensor. The calculated rotational speed may also be used in an indirect-type TPMS. Furthermore, the analysis unit 621 compares the data on the output voltage of the power generation body 1 and the voltage waveform stored in the storage apparatus 604 and determines whether or not there is a tire 70 that is worn (whether or not the tire 70 is worn). The analysis unit 621 may also specify which tire 70 is worn using the data for identifying the tire assembly 7. If it is determined that no tire 70 is worn and all of the tires 70 are normal, the analysis unit 621 repeats the same processing for the data received next. On the other hand, if wearing is determined, the analysis unit 621 causes the warning output unit 622 to output a warning. The warning output unit 622 notifies the user that the tire 70 is worn and prompts replacement of the tire or the like by, for example, displaying a message warning of wear on the display device 65, or the like.

In parallel to this, or before or after this, the analysis unit 621 compares the data on the output voltage of the power generation body 1 and the voltage waveform stored in the storage apparatus 604 and determines the state of the road surface on which the vehicle 6 is currently traveling. The determination of the state of the road surface may be performed each certain time period, for example.

5. Modified Examples

Although an embodiment of the present invention was described above, the present invention is not limited to the above-described embodiment, and various modifications are possible without departing from the gist. For example, the following modifications are possible. Also, the fundamentals of the following modified examples can be combined as appropriate.

In the above-described embodiment, the information relating to the tire 70 is monitored based on the chronological data of the voltage output by the power generation body 1, but it is also possible to monitor the tire 70 based on the chronological data of another physical amount, such as current that flows in the electrical circuit to which the power generation body 1 is connected, or electrical power supplied by the power generation body 1.

In the above-described embodiment, the first surface 100 and the second surface 200 both have recessed and protruding shapes. However, the power generation body 1 may also be constituted such that only one of the first surface 100 and the second surface 200 has a recessed and protruding shape.

The first electrode 120 may also be constituted by weaving a conductive fiber in a woven form. The fiber can be, for example, flexible Cu wire or stainless-steel wire. Furthermore, the first surface 100 may also be formed by the first insulating film 110 covering the outer peripheral surface of the fiber. Similarly, the second electrode 220 may also be formed by weaving a conductive fiber in a woven form, and the second surface 200 may also be formed by the second insulating film 210 covering the outer peripheral surface of the fiber. The fiber can be, for example, flexible Cu wire or stainless-steel wire.

Figure 8A:
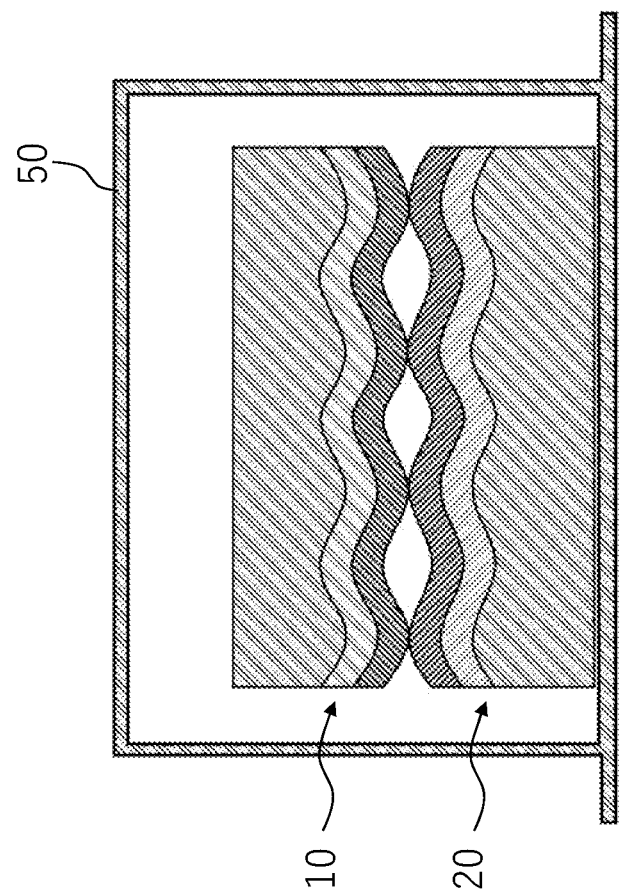
FIG. 8A is a cross-sectional schematic view of a power generation body according to a modified example.
Figure 8B:
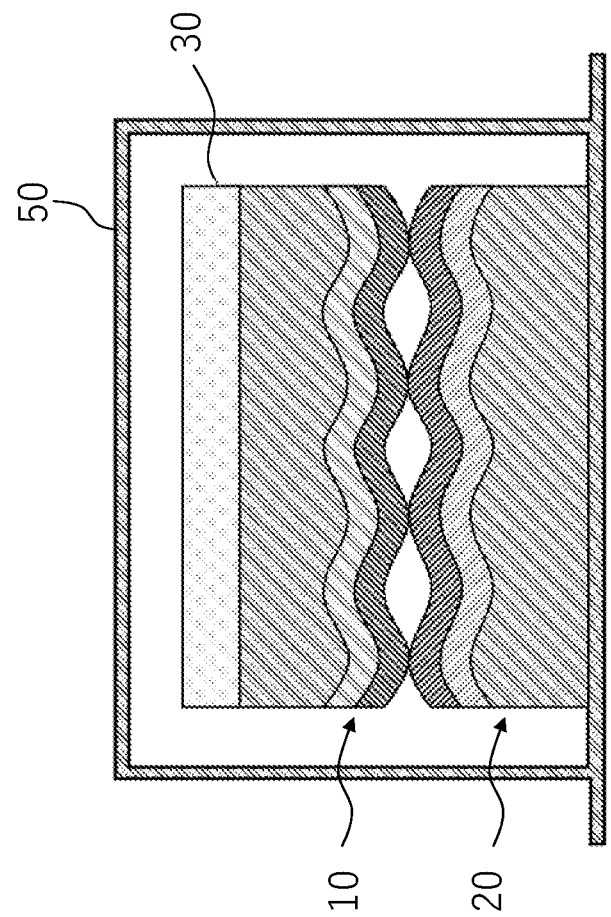
FIG. 8B is a cross-sectional schematic view of a power generation body according to another modified example.
Figure 8C:
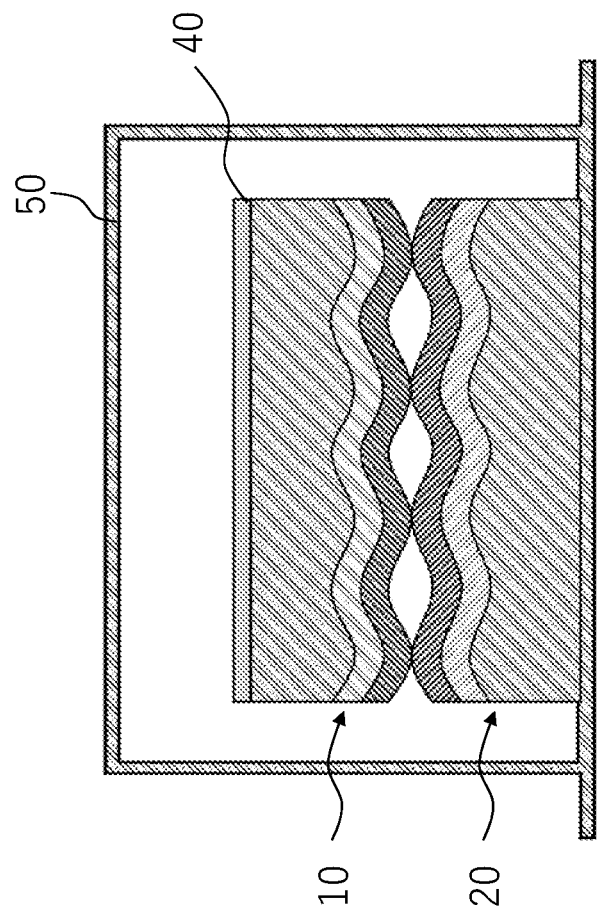
FIG. 8C is a cross-sectional schematic view of a power generation body according to yet another modified example.

The power generation body 1 of the above-described embodiment includes the cushioning material 30 and the weight 40. However, as shown in FIG. 8A, the power generation body 1 may also be formed without the cushioning material 30 and the weight 40. Alternatively, the power generation body 1 may also be formed without the weight 40 as shown in the example of FIG. 8B, or the power generation body 1 may also be formed without the cushioning material 30 as shown in the example of FIG. 8C. As in the example of FIG. 8B, if the weight 40 is omitted, the cushioning material 30 may have mass to a certain extent, and may function as the cushioning material while also having the function of the weight 40. If the cushioning material 30 also includes the function of the weight 40, the cushioning material 30 may also be constituted such that the density increases as it approaches the first member 10. Note that multiple cushioning materials made of the same material or multiple cushioning materials made of different materials may be stacked as appropriate to form the cushioning material 30.

The power generation body 1 may also include multiple first insulating films 110, second insulating films 210, first electrodes 120, and first base materials 130.

In the above-described embodiment, the external control apparatus 60 of the module 8 is an in-vehicle apparatus, but can also be a portable device such as a smartphone, a tablet, or a laptop PC in which the program 610 is installed. At this time, the display of the above-described device can also be used as the display device 65.

The detection method of the detection apparatus 82 is not limited to that of an air pressure detection apparatus in the tire 70. For example, it is also possible to use a strain-gauge sensor, a diaphragm sensor, a semiconductor sensor, or the like. The detection apparatus 82 may also be, for example, a temperature sensor that detects the temperature inside of the tire 70, and may also be a vibration detection sensor (acceleration sensor) that detects the vibration of the tire 70.

In the system 9 of the above-described embodiment, the analysis unit 621 calculates the air pressure and rotational speed of the tire 70 and performs processing such as comparison of output waveforms of the power generation body 1. However, the system 9 may also be constituted such that the microcontroller 81 performs these processes. At this time, the power decrease threshold value stored in advance in the storage apparatus 604 or the output waveform of the power generation body 1 may also be stored in the storage apparatus of the microcontroller 81.

Figure 9:
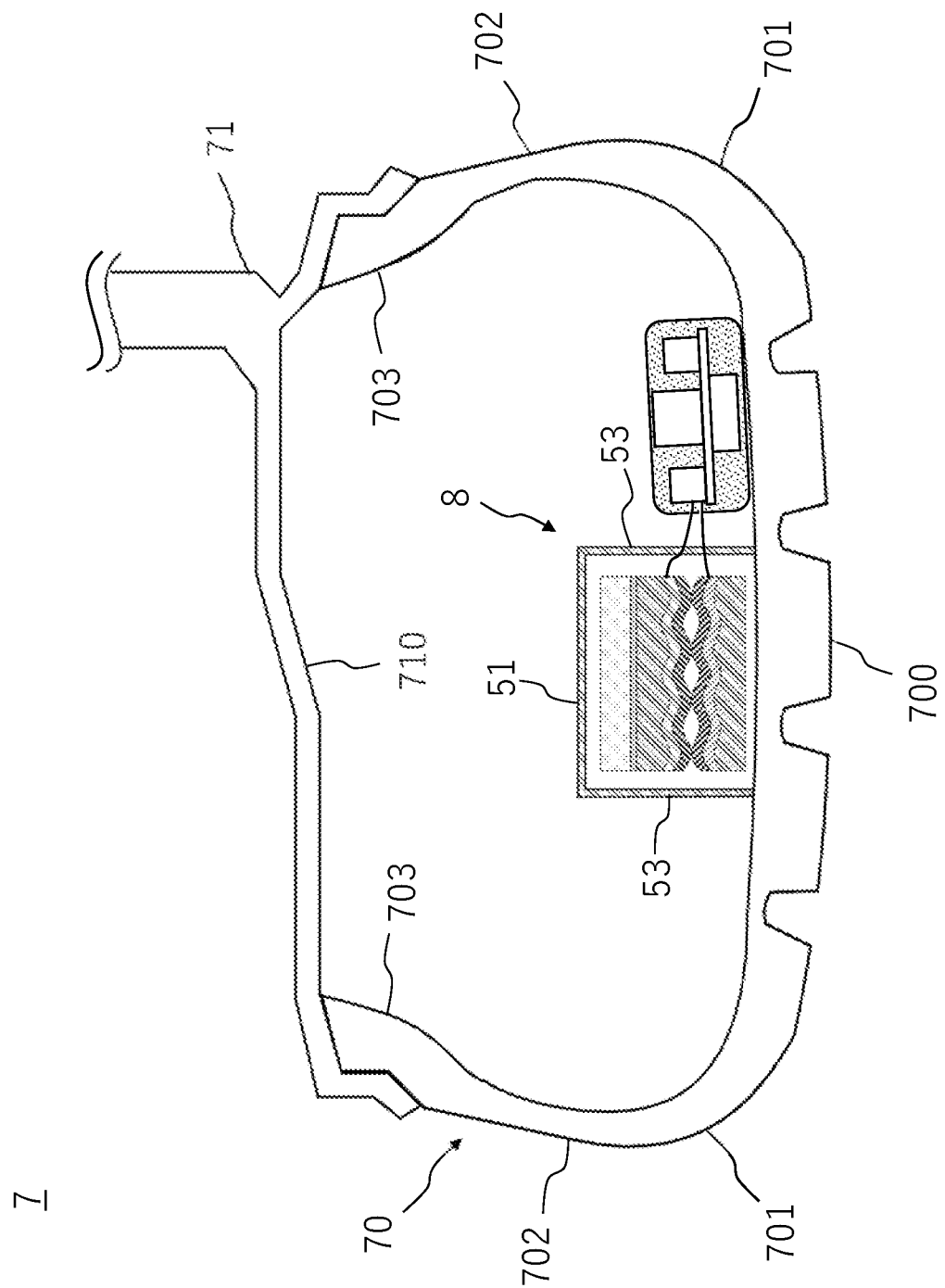
FIG. 9 is a cross-sectional schematic view of a tire assembly according to a modified example.

The shape of the packaging body 50 is not limited to the shape of the above-described embodiment, and for example, may be changed as appropriate, such as omitting the flange portion 54. Also, when the power generation body 1 is incorporated in the tire 70, at least part of the packaging body 50 may be formed by the tire 70. For example, as shown in FIG. 9, the bottom surface portion 52 of the packaging body 50 may also be formed by an inner side surface of the tire 70. That is, the power generation body 1 may also be hermetically sealed by being surrounded by the inner side surface of the tire 70, the side surface portion 53, and the top surface portion 51.

The tire assembly 7 is formed by incorporating the power generation body 1 of the above-described embodiment in the tire 70, but the application of the power generation body 1 is not limited to this.

Working Example

Hereinafter, an experiment performed by the inventors and the results thereof will be indicated. However, the present invention is not limited to this.

Experimental Conditions

Figure 10A:
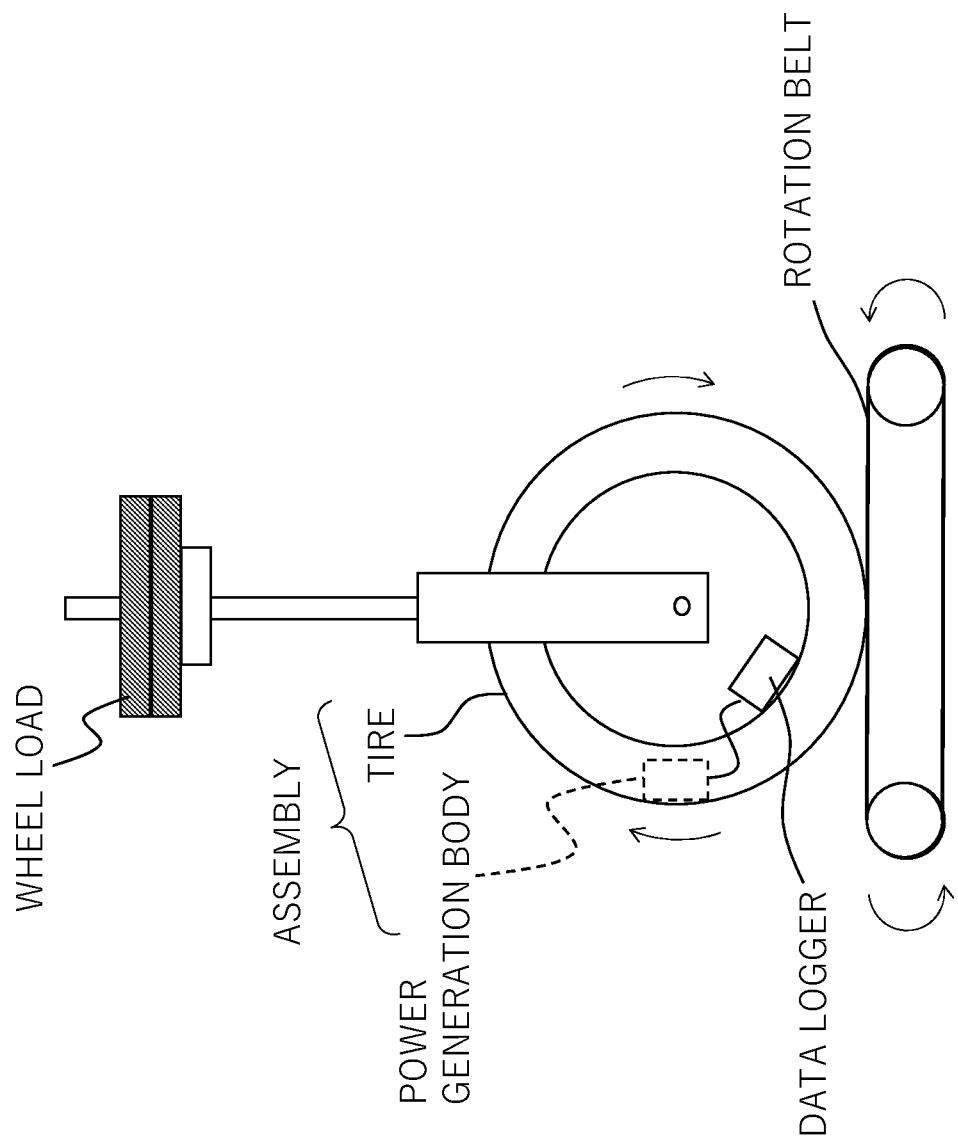
FIG. 10A is a diagram showing a configuration of an experimental apparatus using a tire.

An assembly, in which the power generation body according to a working example which is constituted as in the above-described embodiment was arranged on the inner side surface of the tread portion of the tire, was prepared and was incorporated in a tire rotation experimental apparatus as shown in FIG. 10A. A predetermined wheel load was applied to the assembly using this experimental apparatus, and rotation at a certain speed was applied using a rotation belt. The first electrode and the second electrode of the power generation body were both electrically connected to an external data logger of the assembly. The data logger measured the voltage output by the power generation body while rotation was performed at a certain rotational speed.

The size of the tire was 215/40R17 (the diameter was approximately 604 mm), and the internal pressure was 200 kPa. Also, the wheel load was 3 kN, and the rotational speed was equivalent to 40 km/h.

The power generation body according to the working example includes a first member, a second member, a cushioning material, a weight, and a packaging body, and was incorporated inside of the tire such that the first member was on the inner side in the radial direction of the tire and the second member was on the outer side in the radial direction of the tire. The first member 10A and the second member 20A were both formed into square shapes with 50-mm sides in a plan view.

The weight was a uniform plate made of stainless steel (SUS), with a thickness of 0.1 mm. The cushioning material was soft polyurethane foam with a thickness of 10 mm. The weight and the cushioning material were both formed into square shapes with 50-mm sides in a plan view so as to match the dimensions of the first member and the second member. The packaging body was made of butyl rubber, and had a shape similar to the shape shown in FIG. 4. L1 was 52 (mm), and L2 was 1 (mm).

Experimental Results

Figure 10B:
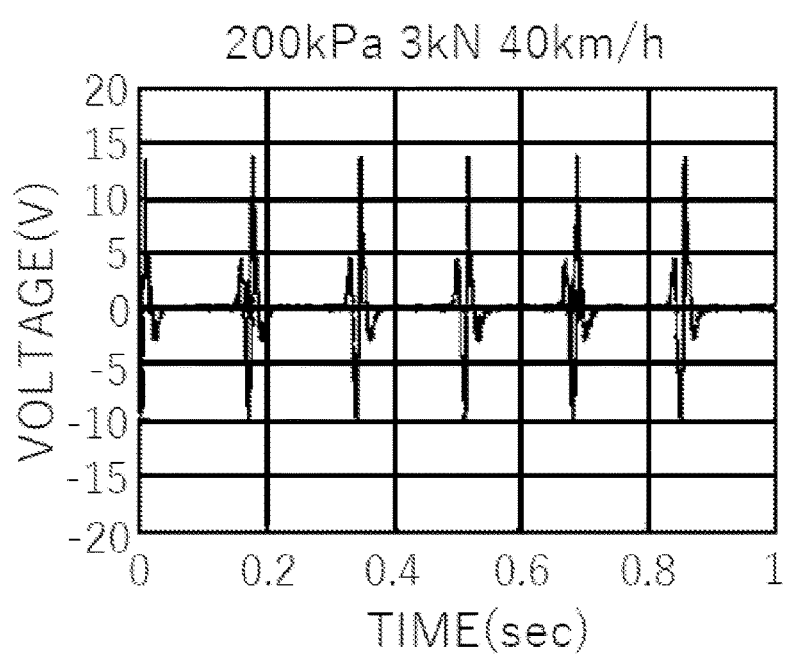
FIG. 10B is a graph of output voltage of a power generation body according to a working example.

A graph of the output voltage (V) of the power generation body with respect to the rotation time (sec) was as shown in FIG. 10B. With the power generation body according to the working example, based on the experimental results, it was confirmed that power generation was performed favorably even in conditions envisioning travel in an actual vehicle.

LIST OF REFERENCE NUMERALS

| | |
|---|---|
| 1 | Power generation body |
| 6 | Vehicle |
| 7 | Tire assembly |
| 10 | First member |
| 20 | Second member |
| 30 | Cushioning material |
| 40 | Weight |
| 41 | Pressing surface |
| 50 | Packaging body |
| 60 | Control apparatus |
| 70 | Tire |
| 100 | First surface |
| 110 | First insulating film |
| 120 | First electrode |
| 130 | First base material |
| 200 | Second surface |
| 210 | Second insulating film |
| 220 | Second electrode |
| 230 | Second base material |

What is claimed is:

1. A power generation body comprising:
a first member having a first insulating film forming a first surface;
a second member having a second insulating film forming a second surface that opposes the first surface and comes into contact with the first surface;
a packaging body that accommodates and hermetically seals the whole of the first member and the second member;
a cushioning material arranged on a side opposite to the first surface of the first member; and
a plate-shaped weight that is arranged between the cushioning material and the first member and forms a pressing surface that presses the first member,
wherein the packaging body is made of rubber or elastomer,
wherein the first member and the second member are configured such that a real contact surface area between the first surface and the second surface changes according to pressure applied to the first member and the second member, and
one of the first insulating film and the second insulating film is positively charged and the other is negatively charged due to the real contact surface area changing, and
wherein the cushioning material and the weight are hermetically sealed in the packaging body.

2. The power generation body according to claim 1, wherein
the packaging body is made of butyl rubber.

3. The power generation body according to claim 2, wherein
the weight is made of a hard material.

4. The power generation body according to claim 2, wherein
the first member further includes a first electrode that is arranged on a rear surface of the first surface so as to come into contact with the first insulating film,
the second member further includes a second electrode that is arranged on a rear surface of the second surface so as to come into contact with the second insulating film, and the first electrode and the second electrode are made of a flexible material.

5. The power generation body according to claim 1, wherein
the weight is made of a hard material.

6. The power generation body according to claim 1, wherein
the first member further includes a first electrode that is arranged on a rear surface of the first surface so as to come into contact with the first insulating film,
the second member further includes a second electrode that is arranged on a rear surface of the second surface so as to come into contact with the second insulating film, and
the first electrode and the second electrode are made of a flexible material.

7. A tire assembly comprising:
the power generation body according to claim 6;
a tire attached to a wheel; and
an electronic device configured to receive a supply of electrical power output from the power generation body,
wherein the power generation body is arranged inside of the tire.

8. The tire assembly according to claim 7, further comprising
a power storage cell configured to accumulate electrical power output by the power generation body,
wherein the electronic device receives a supply of electrical power accumulated in the power storage cell.

9. The tire assembly according to claim 7, wherein
the electronic device includes a communication apparatus capable of data communication with an external apparatus.

10. A tire monitoring system comprising:
the tire assembly according to claim 9; and
an external control apparatus capable of data communication with the communication apparatus,
wherein the communication apparatus transmits, to the external control apparatus, output data of at least one of a voltage and a current output by the power generation body and a physical amount obtained based on at least one of the voltage and the current, and
the external control apparatus monitors information relating to the tire based on output data received from the communication apparatus.

11. The tire monitoring system according to claim 10, wherein
the information relating to the tire includes at least one of information relating to a rotational speed of the tire, information relating to wear of the tire, and information relating to a state of a road surface on which a vehicle in which the tire is mounted travels.

12. The tire monitoring system according to claim 10, wherein
the external control apparatus is mounted in a vehicle in which the tire assembly is included.

13. A tire monitoring method comprising:
preparing a vehicle in which the tire assembly according to claim 7 is mounted;
collecting output data of at least one of a voltage and a current output by the power generation body during travel of the vehicle, and a physical amount obtained based on at least one of the voltage and the current; and
monitoring information relating to the tire based on the collected output data.

14. The tire assembly according to claim 7, wherein the packaging body includes a top surface and four side surfaces, and a bottom surface of the packaging body, opposite to the top surface, is formed by an inner side surface of the tire, such that the first member, the second member, the cushioning material and the weight are hermetically sealed by being surrounded by the inner side surface of the tire, and the four side surfaces and the top surface of the packaging body.

15. A tire assembly comprising:
the power generation body according to claim 1;
a tire attached to a wheel; and
an electronic device configured to receive a supply of electrical power output from the power generation body,
wherein the power generation body is arranged inside of the tire.

16. The tire assembly according to claim 15, further comprising
a power storage cell configured to accumulate electrical power output by the power generation body,
wherein the electronic device receives a supply of electrical power accumulated in the power storage cell.

17. The power generation body according to claim 1, wherein the packaging body includes a top surface, four side surfaces and a bottom surface opposite to the top surface, and the bottom surface includes a flange portion extending beyond the side surfaces.

18. A tire assembly comprising:
a power generation body, comprising:
a first member having a first insulating film forming a first surface;
a second member having a second insulating film forming a second surface that opposes the first surface and comes into contact with the first surface;
a packaging body that accommodates and hermetically seals the whole of the first member and the second member;
wherein the packaging body is made of rubber or elastomer,
wherein the first member and the second member are configured such that a real contact surface area between the first surface and the second surface changes according to pressure applied to the first member and the second member, and
one of the first insulating film and the second insulating film is positively charged and the other is negatively charged due to the real contact surface area changing, and
wherein the first member further includes a first electrode that is arranged on a rear surface of the first surface so as to come into contact with the first insulating film,
the second member further includes a second electrode that is arranged on a rear surface of the second surface so as to come into contact with the second insulating film, and
the first electrode and the second electrode are made of a flexible material;
a tire attached to a wheel; and
an electronic device configured to receive a supply of electrical power output from the power generation body,
wherein the power generation body is arranged inside of the tire, and
wherein the packaging body includes a top surface and four side surfaces, and a bottom surface of the packaging body, opposite to the top surface, is formed by an inner side surface of the tire, such that the first member, the second member, the cushioning material and the weight are hermetically sealed by being surrounded by the inner side surface of the tire, and the four side surfaces and the top surface of the packaging body.

\* \* \* \* \*